(12) United States Patent
Watanabe et al.

(10) Patent No.: US 7,120,770 B2
(45) Date of Patent: Oct. 10, 2006

(54) DATA BACKUP SYSTEM AND METHOD FOR THE SAME

(75) Inventors: Satoru Watanabe, Kokubunji (JP); Yoshio Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 10/849,006

(22) Filed: May 20, 2004

(65) Prior Publication Data
US 2005/0198456 A1    Sep. 8, 2005

(30) Foreign Application Priority Data
Mar. 5, 2004    (JP) .............................. 2004-061584

(51) Int. Cl.
*G06F 12/16*    (2006.01)
(52) U.S. Cl. ...................... 711/162; 711/161; 707/201; 707/202; 707/203; 707/204
(58) Field of Classification Search ........ 707/201–204; 711/161, 162
See application file for complete search history.

(56) References Cited

U.S. PATENT DOCUMENTS

| | | | |
|---|---|---|---|
| 5,214,781 A * | 5/1993 | Miki et al. ................... | 707/203 |
| 5,321,832 A * | 6/1994 | Tanaka et al. ............... | 707/204 |
| 5,392,244 A | 2/1995 | Jacobson et al. | |
| 5,404,508 A | 4/1995 | Konrad et al. | |
| 5,432,922 A | 7/1995 | Polyzois et al. | |
| 5,706,470 A * | 1/1998 | Okada ......................... | 711/161 |
| 5,860,122 A * | 1/1999 | Owada et al. ............... | 711/162 |
| 6,023,707 A * | 2/2000 | Hamada et al. ............. | 707/202 |
| 6,029,178 A * | 2/2000 | Martin et al. ................ | 707/201 |
| 6,377,959 B1 * | 4/2002 | Carlson ....................... | 707/202 |
| 6,487,645 B1 | 11/2002 | Clark et al. | |
| 6,539,461 B1 * | 3/2003 | Suzuki et al. ............... | 711/162 |
| 6,539,462 B1 | 3/2003 | Mikkelsen et al. | |
| 6,611,850 B1 * | 8/2003 | Shen .......................... | 707/204 |
| 6,694,413 B1 * | 2/2004 | Mimatsu et al. ............ | 711/162 |
| 6,850,958 B1 | 2/2005 | Wakabayashi | |
| 2005/0154845 A1 | 7/2005 | Shackelford et al. | |

OTHER PUBLICATIONS

ACM Transactions on Database Systems. vol. 19, No. 3, Sep. 1994, pp. 423-449." Evaluation of Remote Backup Algorithms for Transaction-Processing Systems".
K. Hu, "An Optimized Two-Safe Approach to Maintaining Remote Backup Systems", pp. 1-18.

* cited by examiner

*Primary Examiner*—Pierre Bataille
*Assistant Examiner*—Chase Peers
(74) *Attorney, Agent, or Firm*—Mattingly, Stanger, Malur & Brundidge, P.C.

(57) ABSTRACT

It is an object to eliminate possibilities in which newest backup data cannot be created owing to overwriting of data update records when performing backup using a duplicating system. The data backup system, including an active system as a computer system of a backup source and a standby system as a computer system of a backup destination, is provided in such that a communication settings judging section is provided in the standby system for actively changing settings of a data communicating section for transferring data update records to thereby prevent overwriting of portions among data update records that are necessary for creating newest backup data.

11 Claims, 11 Drawing Sheets

DATA BACKUP SYSTEM AND METHOD FOR THE SAME

CROSS-REFERENCE TO RELATED APPLICATION

The present application claims priority from Japanese Patent Application No. JP 2004-61584 filed on Mar. 5, 2004, the content of which is hereby incorporated by reference into this application.

TECHNICAL FIELD OF THE INVENTION

The present invention relates to a data backup system and a backup method of data.

BACKGROUND OF THE INVENTION

Data backup systems employing two computer systems are widely employed. Backup of data means that the data identical to those of one computer system are created and stored in another computer system. A computer system of a backup source is referred to as an active system and a computer system of a backup destination as a standby system. Further, data that are stored in the standby system are referred to as backup data. Such backup of data using a duplicating system is described in, for instance, CHRISTOS A. POLYZOIS, HECTOR GARCIA-MOLINA, "Evaluation of Remote Backup Algorithms for Transaction-Processing Systems", ACM Transactions on Database Systems, Vol. 19, No. 3, September 1994, Pages 423–449 (hereinafter referred to as Reference 1).

A known method for backup using a duplicating system is a log transfer method. The log transfer method is a method in which data update records of an active system are transferred to a standby system whereupon backup data are created in the standby system. In the log transfer method, data of the active system and backup data of the standby system are made identical at the stage of starting backup. After start of backup, data update records of the active system are transferred to the standby system. In the standby system, backup data are updated using the transferred data update records. Results of studies in which the log transfer method is applied to a database system are described in Reference 1.

In general, computer systems have external storage devices, and data of computer systems are stored in the external storage devices. The external storage devices mean, for example, hard disk drives or disk arrays, which are magnetic storage devices.

Some of the external storage devices have copy functions for copying data between two devices. For instance, external storage device SANRISE9980V which is a product of Hitachi, Ltd. has HITACHI True Copy Function. The HITACHI True Copy Function is a function of transferring data via a network and of copying data of one SANRISE9980V to another SANRISE9980V. In case data are added to the external storage device of the copy source, the same data are added to the external storage device of the copy destination as well. When data of the external storage device of the copy source are overwritten, the data on the external storage device are also overwritten. Storage areas of the external storage devices are used upon dividing them into logical areas referred to as volumes, and whether copy functions are to be used or not can be set for each of the volumes.

Backup using the log transfer method is performed by using copy functions of external storage devices. The structure is as follows. At the stage of starting backup, data of the active system and backup data of the standby system are made identical. Data update records that have been added to the external storage device of the active system are copied to the external storage device of the standby system by using the copy functions to the volumes storing therein data update records. In the standby system, newest backup data are created using the copied data update records.

SUMMARY OF THE INVENTION

When performing backup through the log transfer method by using copy functions of the external storage device, it would conventionally happen that no newest backup data could be created. This occurred due to the fact that data update records were overwritten prior to creating newest backup data in the standby system. Newest backup data cannot be created in the standby system since overwritten data cannot be referred to.

The present invention aims to solve the problems of preventing a case in which no newest backup data can be created through overwriting of data update records when backup through log transfer method is to be performed by using copy functions of the external storage device.

The data backup system according to the present invention includes at least a standby system, which is a computer system of a backup destination. The standby system includes a data communicating section that receives data update records and stores them in an external storage device; a data updating duplicating section that refers to the data update records to create backup data; a communication settings judging section that judges changes in settings of the data communicating section; and a communication settings changing section that changes settings of the data communicating section.

The external storage device is divided into a plurality of storage areas; orders of usage are defined for the storage areas for storing the data update records; and the communication settings judging section judges settings of the data communicating section on the orders of usage of the storage areas that have been referred to by the data updating duplicating section.

There are also cases in which functions of preventing overwriting of data update records are provided for both of an active system, which is a computer system of a backup source and a standby system, which is a computer system of a backup destination. The active system includes a data updating section that stores data and data update records in an external storage device; a data communicating section that sends the data update records; a communication settings judging section that judges settings of the data communicating section; and a communication settings changing section that changes settings of the data communicating section.

The standby system includes a data communicating section that receives the data update records and stores them in an external storage device; a data updating duplicating section that refers to the data update records to create backup data; and a communication settings changing section that changes settings of the data communicating section.

The external storage device of the active system and the external storage device of the standby system are divided into a plurality of storage areas; orders of usage are defined for the storage areas for storing the data update records; the communication settings judging section of the active system judges settings of the data communicating section on the orders of usage of the storage areas that have been referred to by the data updating section; and the communication settings judging section of the standby system judges settings of the receiving section on the orders of usage of the storage areas that have been referred to by the data updating duplicating section.

By providing communication settings judging sections and by changing settings of the data communicating section in conjunction with the data updating duplicating section in the present invention, overwriting of portions necessary for creating newest backup data from among data update records is prevented. Cases in which newest backup data cannot be created due to overwriting of data update records can thus be avoided.

DESCRIPTION OF THE PREFERRED EMBODIMENTS

There are two embodiments of the present invention, namely one in which the communication settings judging section is provided in the standby system and another in which the communication settings judging sections are provided in the active system and in the standby system. The two embodiments of the present invention will now be explained with reference to the drawings.

Figure 1:
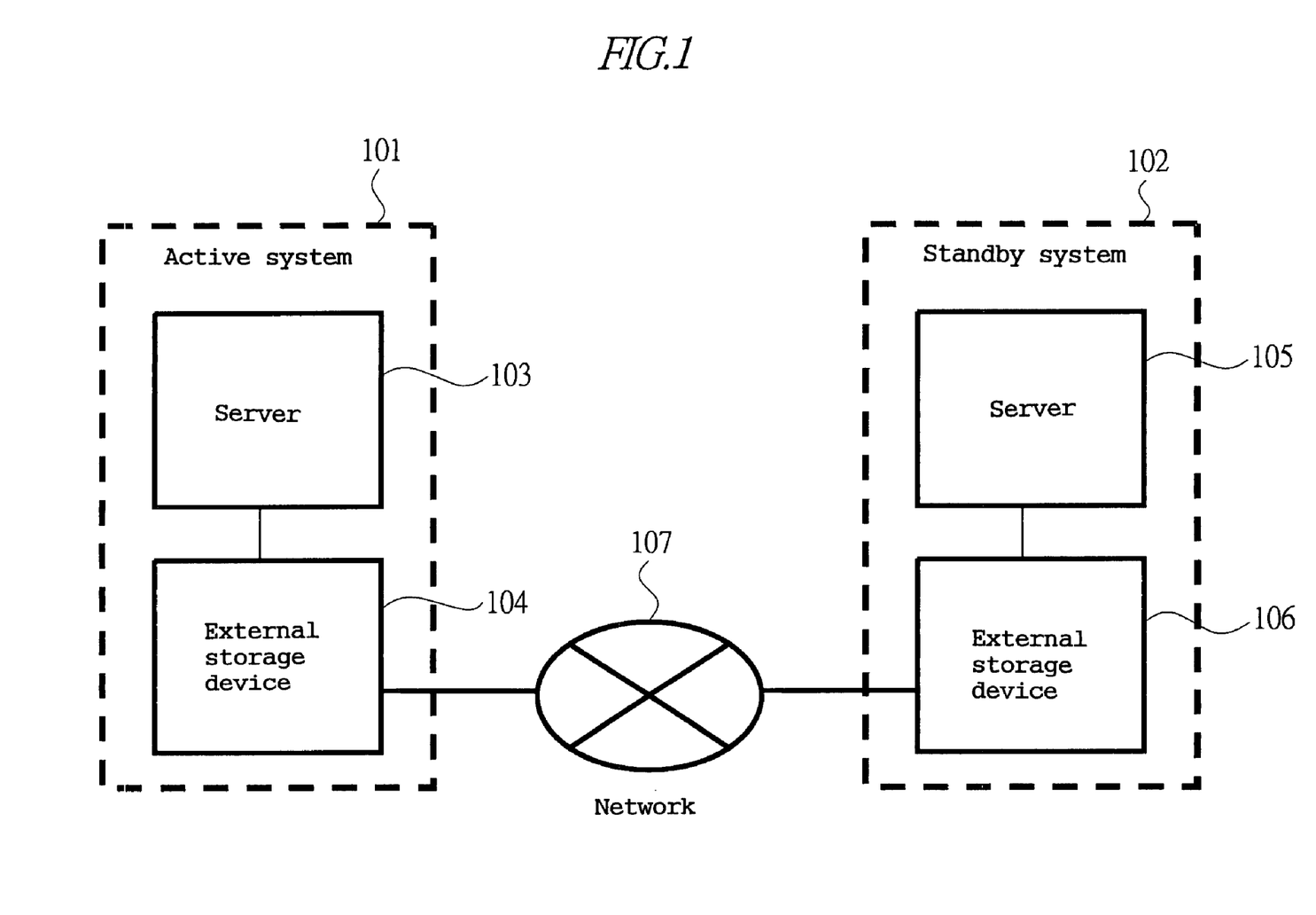
FIG. 1 is a block diagram of a data backup system using a duplicating system.

FIG. 1 is a block diagram of a data backup system using a duplicating system. A backup system using a duplicating system includes two computer systems. A computer system of a backup source is referred to as an active system 101 while a computer system on a backup destination is referred to as a standby system 102. The active system 101 includes a server 103 of the active system and an external storage device 104 of the active system. The standby system 102 includes a server 105 of the standby system and an external storage device 106 of the standby system. The external storage device 104 of the active system and the external storage device 106 of the standby system are connected via a network 107.

Figure 2:
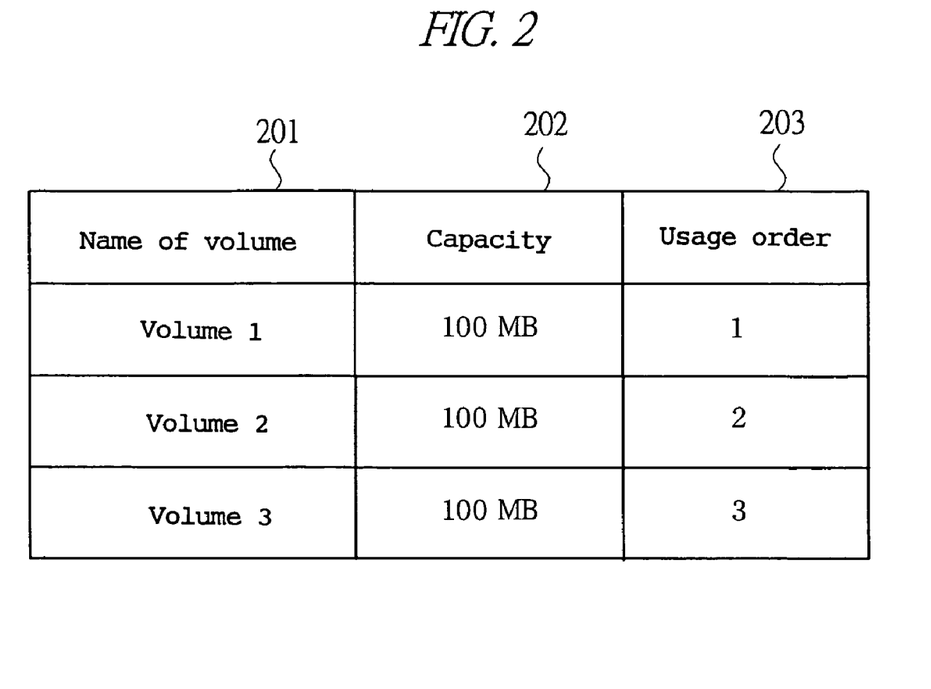
FIG. 2 is a view illustrating an example of settings for dividing storage areas of an external storage device.

FIG. 2 is a view illustrating an example of settings for dividing storage areas of the external storage device 104 of the active system and the external storage device 106 of the standby system. The external storage devices are used upon being divided into storage areas referred to as volumes. As volume names 201, names of volumes for storing data update records are designated. As capacities 202, storage capacities for the respective volumes are designated. As orders of usage 203, orders of using the volumes are designated. Storage is first performed to the volume of the first order of usage, and when the volume of the first order of usage has become full, storage is performed to the volume of the second order of usage. When the volume of the last order of usage has become full, the volume of the first order of usage is overwritten for storage. In the example as illustrated in FIG. 2, division is performed into three storage areas, volume 1, volume 2 and volume 3. The capacity of the respective volumes is 100 MB. When storing data update records, it has been set to use the volume 1, the volume 2 and the volume 3 in this order. This setting is stored in internal storage areas of the server 103 of the active system and of the server 105 of the standby system. The external storage device 104 of the active system and the external storage device 106 of the standby system are used upon dividing them into identical volumes, and both servers use the same settings.

Figure 3:
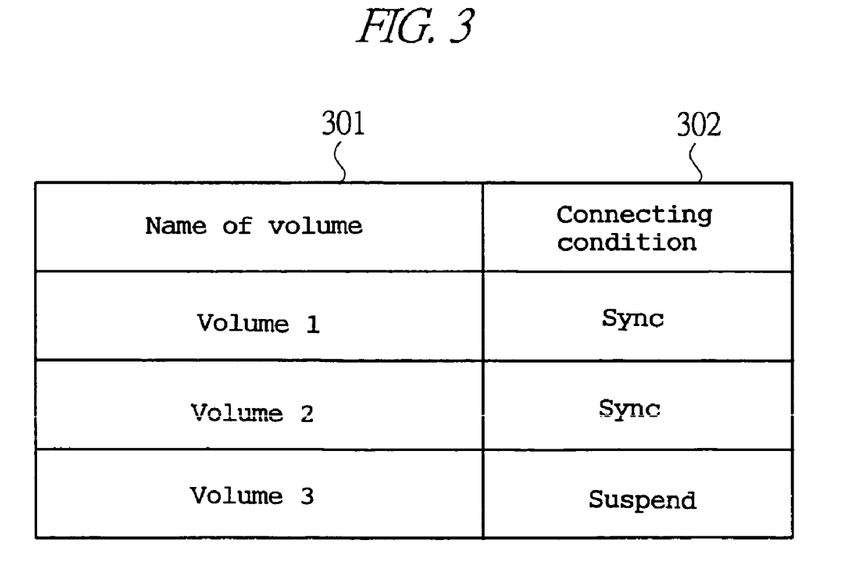
FIG. 3 is a view illustrating an example for settings of a communicating section setting table.

FIG. 3 is a view illustrating an example for settings of communicating section setting tables for setting whether or not copy functions are to be used for the respective volumes. A set value used when copy functions are used is referred to as "sync" and a set value when copy functions are not used is referred to as "suspend". According to the first embodiment of the present invention, a setting for the volume which order of usage is last is set as "suspend" while settings for all other volumes are set as "sync" at the stage of starting backup. According to the second embodiment of the present invention, all volumes are set to "sync" at the stage of starting backup. The communicating section setting tables are stored in the external storage device 104 of the active system or in the external device 106 of the standby system. Hereinafter, explanations will be made on the basis of a case in which the communicating section setting tables are stored in the external storage device 106 of the standby system.

Figure 4:
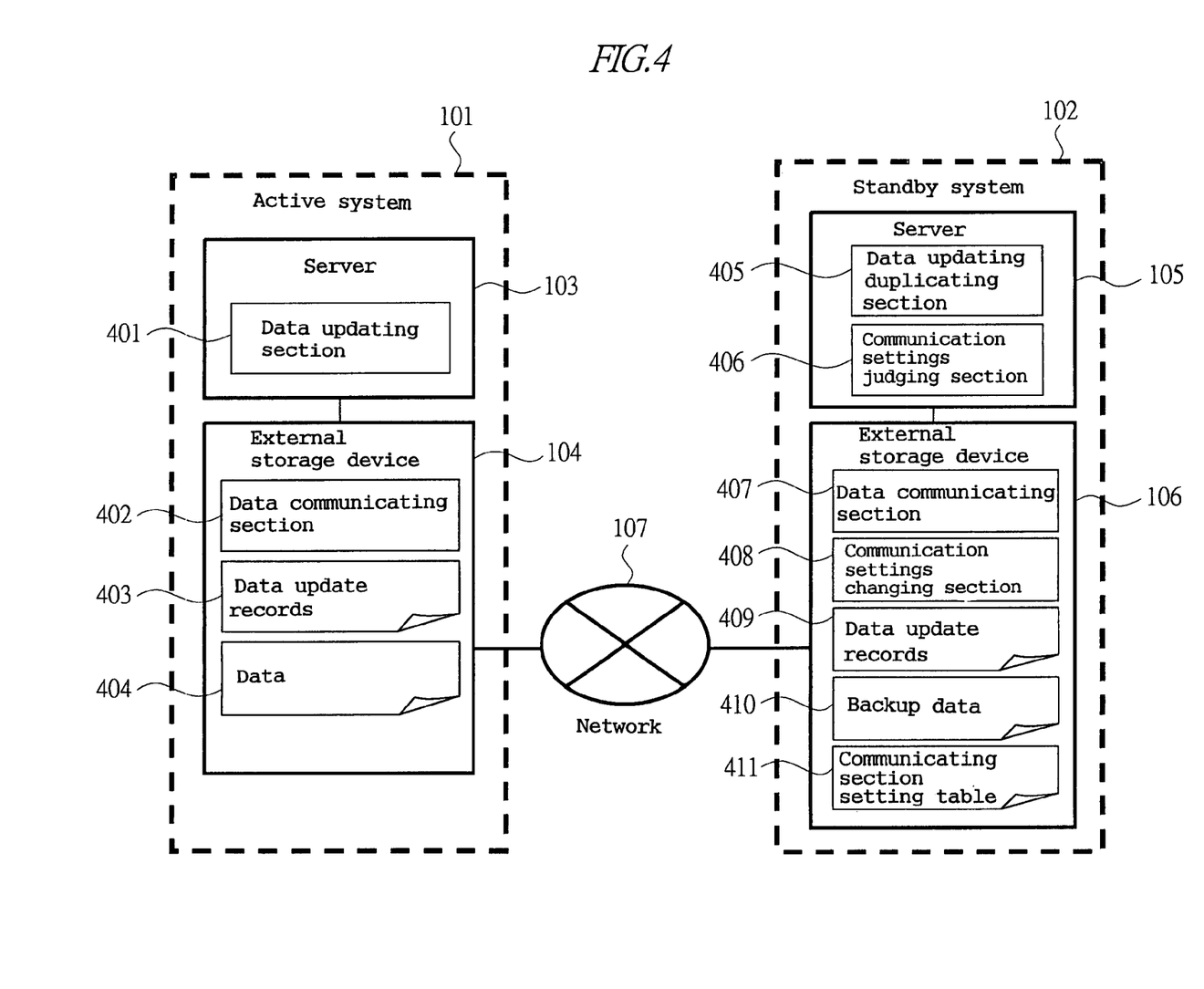
FIG. 4 is a functional diagram of a backup system according to a first embodiment.

FIG. 4 is a functional diagram of a backup system according to the first embodiment of the present invention. The server 103 of the active system 101 comprises a data updating section 401. The external storage device 104 of the active system comprises a data communicating section 402 for storing therein data update records 403 and data 404. The server 105 of the standby system comprises a data updating duplicating section 405 and a communication settings judging section 406. The external storage device 106 of the standby system comprises a data communicating section 407 and a communication setting changing section 408 and stores therein data update records 409, backup data 410, and communicating section setting tables 411. The communicating section setting tables 411 are tables for storing settings of operations of the data communicating section 402 and the data communicating section 407. As illustrated in FIG. 3, it is written in the communicating section setting tables 411 whether copy functions are used for the respective volumes or not.

Figure 5:
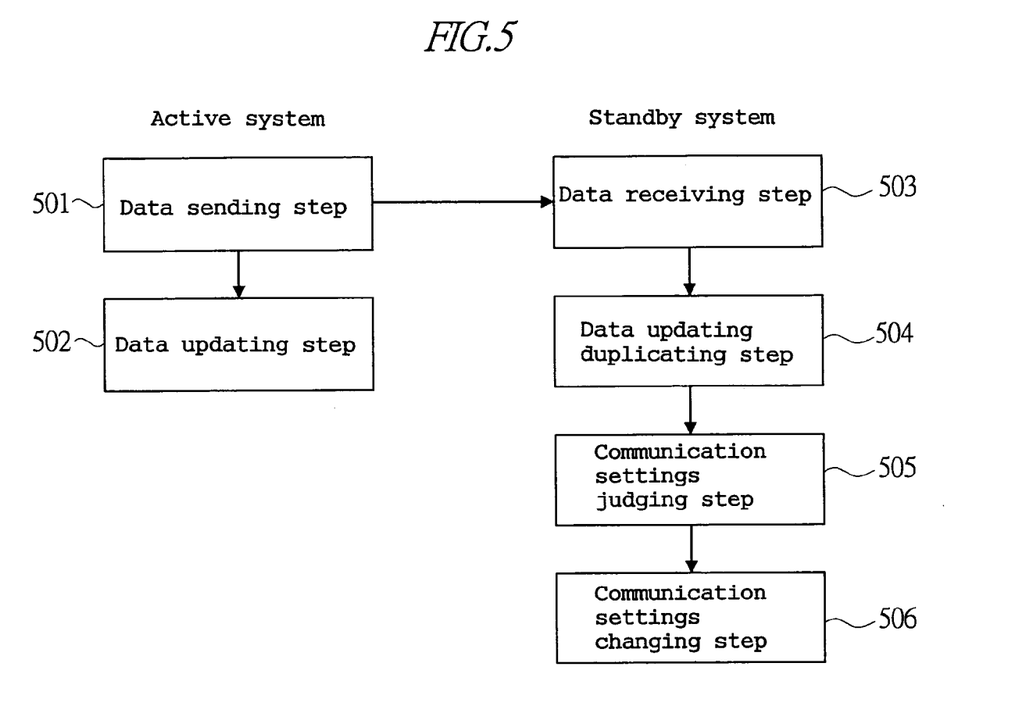
FIG. 5 is a flowchart illustrating an order of operations of respective sections according to the first embodiment.

FIG. 5 is a flowchart illustrating an order of operations of the respective sections according to the first embodiment. In the first embodiment, the flow of FIG. 5 is repeatedly executed, and a newest backup is created in the standby system. In a data sending step 501, the data updating section 401 and the data communicating section 402 are operated. In the steps of a data updating step 502, a data receiving step 503, a data updating duplicating step 504, a communication settings judging step 505 and a communication settings changing step 506, the data updating section 401, the data communicating section 407, the data updating duplicating section 405, the communication settings judging section 406, and the communication settings changing section 408 are operated. Detailed operations of the respective sections will now be recited.

Figure 6:
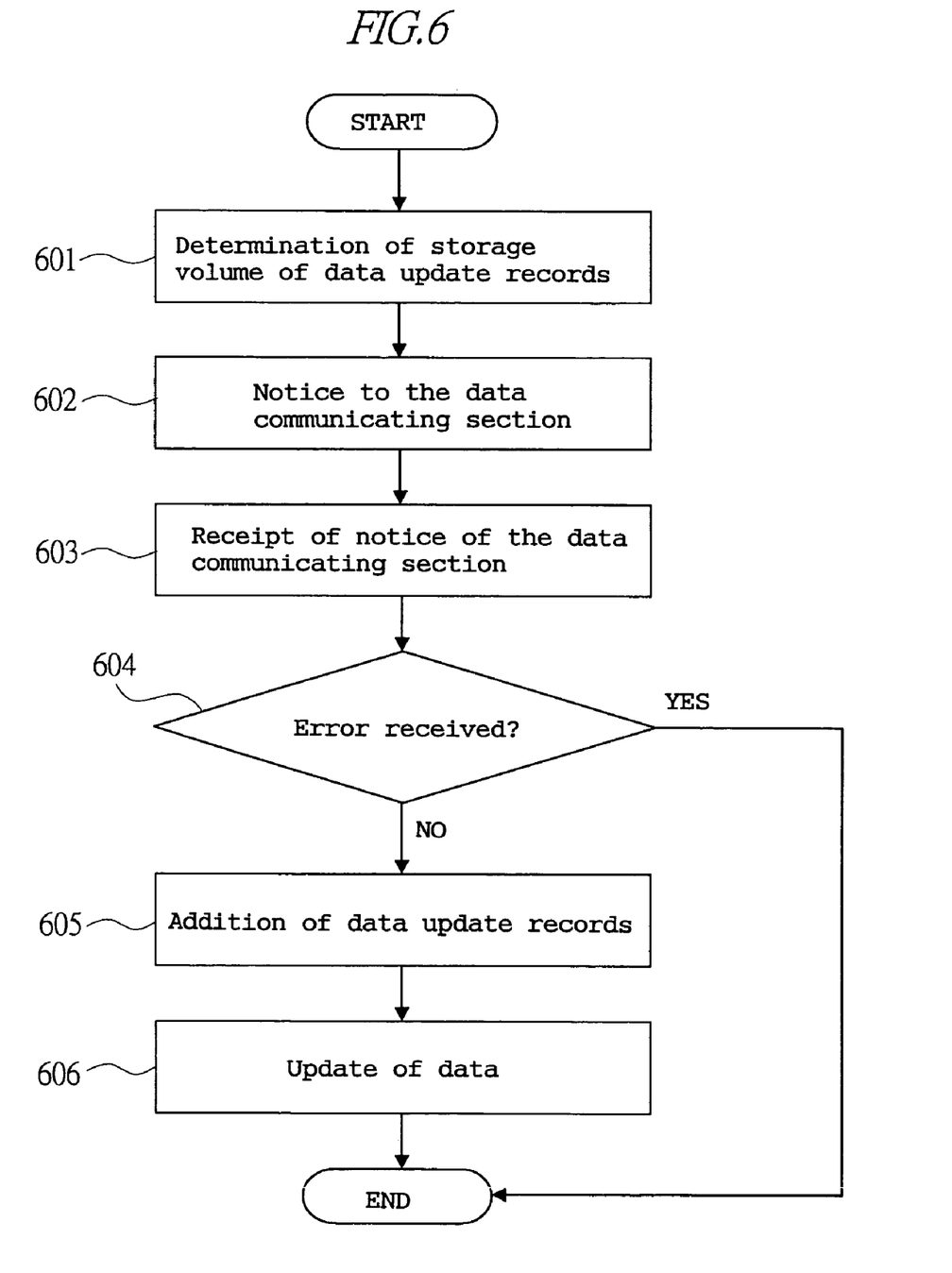
FIG. 6 is a flowchart illustrating operations of a data updating section.

FIG. 6 is a flowchart illustrating operations of the data updating section 401. In process 601, volumes for storing data update records are determined. The data update records are stored according to the order of usage for the volumes as illustrated in FIG. 2. The volume of the first order of usage is first used, and when the volume is full, the next volume is used. In process 602, the name of a volume 301 as determined in process 601 and the data update records that are to be added in process 605 are noticed to the data communicating section 402. In process 603, the notices from the data communicating section 402 are received. In judgment 604, it is judged whether the content as received in process 603 is "error" or not, and when an "error" has been received, the flow proceeds to termination. In process 605, data update records that are to be updated in process 606 are added to the data update records 403. In process 606, the data 404 are updated.

The data communicating section 402 starts operation upon notice of the process 602 of the data updating section 401. The data communicating section 402 refers to the communicating section setting tables 411 for judging whether the setting of the data communicating section 401 for the volume as noticed by the data updating section 401 is "sync" or not. When it is not "sync", and "error" is noticed to the data updating section 401. When it is "sync", "okay" is noticed to the data updating section, and the data update records as noticed by the data updating section 401 are noticed to the data communicating section 407. Operations of the data communicating section 402 and the process 601, the process 602, the process 603, and the judgment 604 correspond to the data sending step 501 while the process 605 and the process 606 correspond to the data updating step 502.

Figure 7:
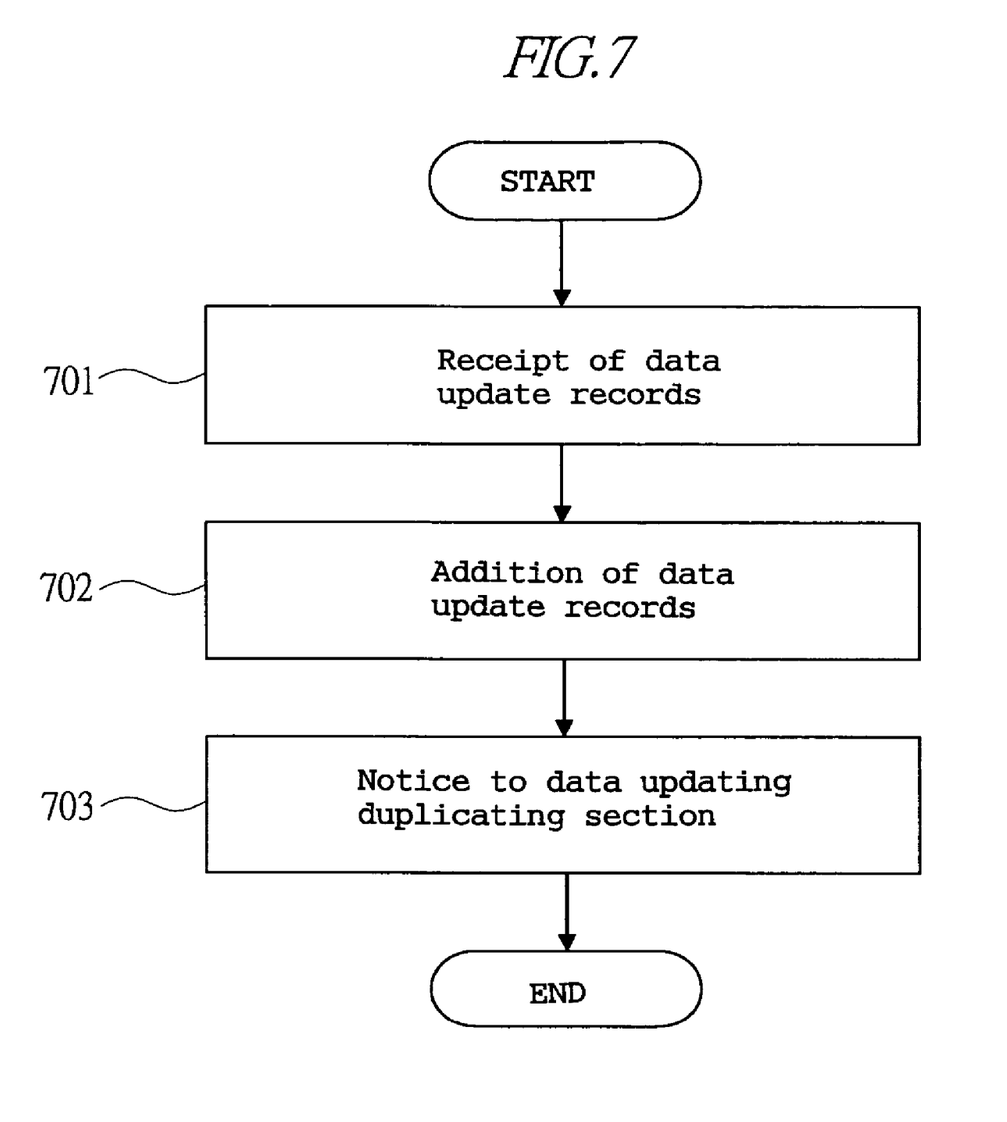
FIG. 7 is a flowchart illustrating operations of a data communicating section.

FIG. 7 is a flowchart illustrating operations of the data communicating section 407. The data communicating section 407 starts operations upon notice of the data communicating section 402. In process 701, the data update records as noticed by the data communicating section 402 are received. In process 702, the data update records as received in process 701 are added to the data update records 409. In process 703, the data updating duplicating section 405 is noticed that data update records have been added. The operation flow of the data communicating section 407 corresponds to the data receiving step 503.

Figure 8:
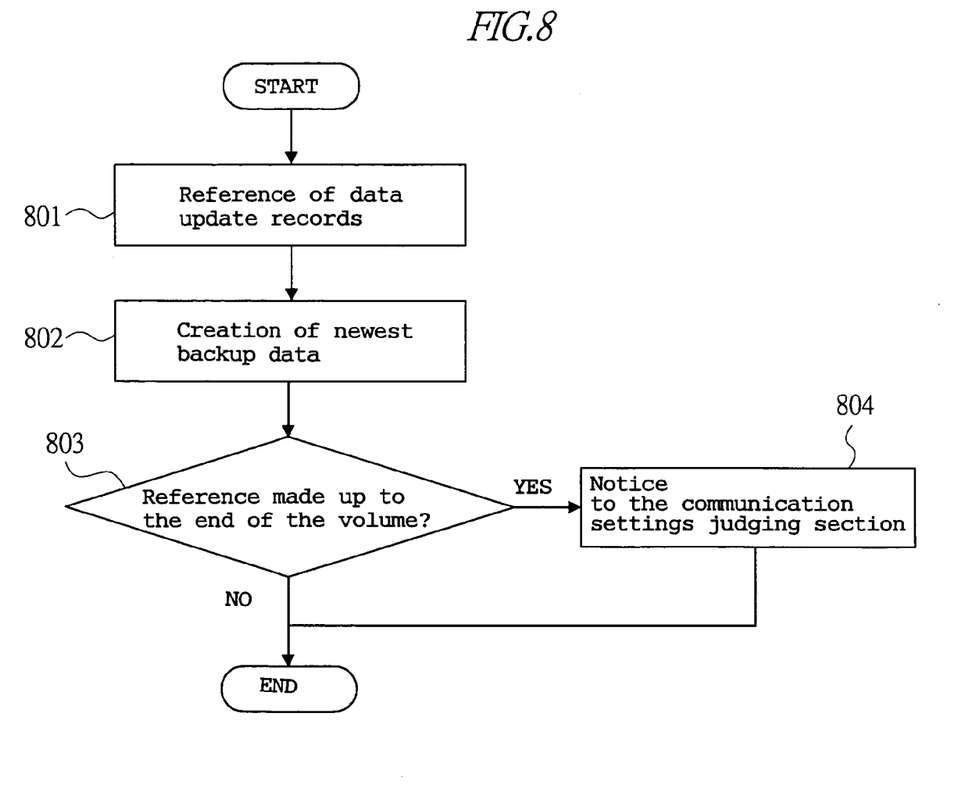
FIG. 8 is a flowchart illustrating operations of a data updating duplicating section.

FIG. 8 is a flowchart illustrating operations of the data updating duplicating section 405. The data updating duplicating section 405 starts operation upon notice of the process 703 of the data communicating section 407. Process 801 refers to data update records that have been newly added by the data communicating section 407. In process 802, newest backup data 410 are created in accordance with contents of the data update records as referred to. In judgment 803, it is judged whether the process 801 has referred to the volume up to its end. If reference up to the end of the volume has been made, the flow proceeds to process 804 while when no reference up to the end of the volume has been made, the flow proceeds to termination. Whether the process 801 has referred to up to the end of the volume or not can be judged from the fact whether the place of storage of the data update records as referred to in process 801 is the end of the volume or not. In process 804, the communication settings judging section 406 is noticed that reference has been made up to the end of the volume. The operation flow of the data updating duplicating section 405 corresponds to the data updating and reproducing step 504.

Figure 9:
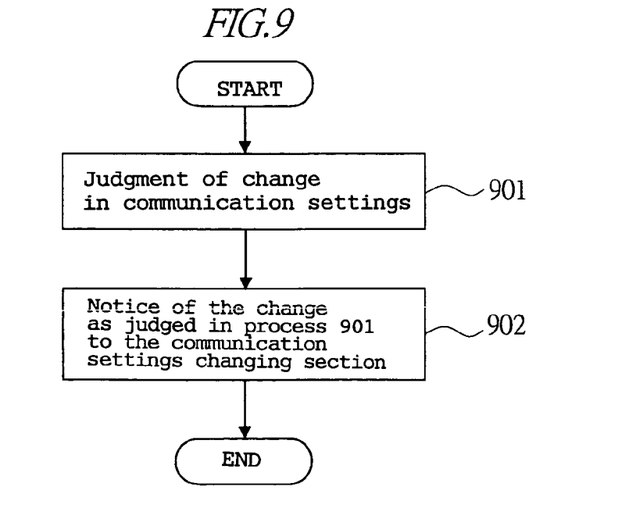
FIG. 9 is a flowchart illustrating operations of a communication settings judging section.

FIG. 9 is a flowchart illustrating operations of the communication settings judging section 406. The communication settings judging section 406 starts operation upon notice of the process 804 of the data updating duplicating section 405. In process 901, changes in settings are judged. It is judged to change the communicating setting of the volume that has been referred up to the end in the process 801 to "suspend" and to change the communicating setting of the volume that precedes the volume that has been referred up to the end in process 801 by one to "sync". In process 902, the changes as judged in the process 901 are noticed to the communication settings changing section 408. The operation flow of the communication settings judging section 406 corresponds to the communication settings judging step 505.

The communication settings changing section 408 starts operation upon notice of the process 902 of the communication settings judging section 406. The communication settings changing section 408 changes the communication settings tables 411 in accordance with changes as judged by the communication settings judging section 406. Operations of the communication settings changing section 408 correspond to the communication settings changing step 506.

The above is the first embodiment. When a large amount of data update records is added in the data updating section 401, all volumes become full, and data update records are overwritten from the first volume. It is, conventionally, possible that no newest backup data could be created due to overwriting of data update records before the data updating duplicating section 405 refer to. According to the first embodiment, the setting of the data communication section for the volume preceding the volume referred to by the data updating duplicating section 405 is defined as "suspend" so that the data updating section 401 cannot write to the volume preceding the volume referred to by the data updating duplicating section 405, and addition of data update records is terminated. It is therefore possible to prevent a case in which no newest backup data can be prevented owing to overwriting of update records.

Figure 10:
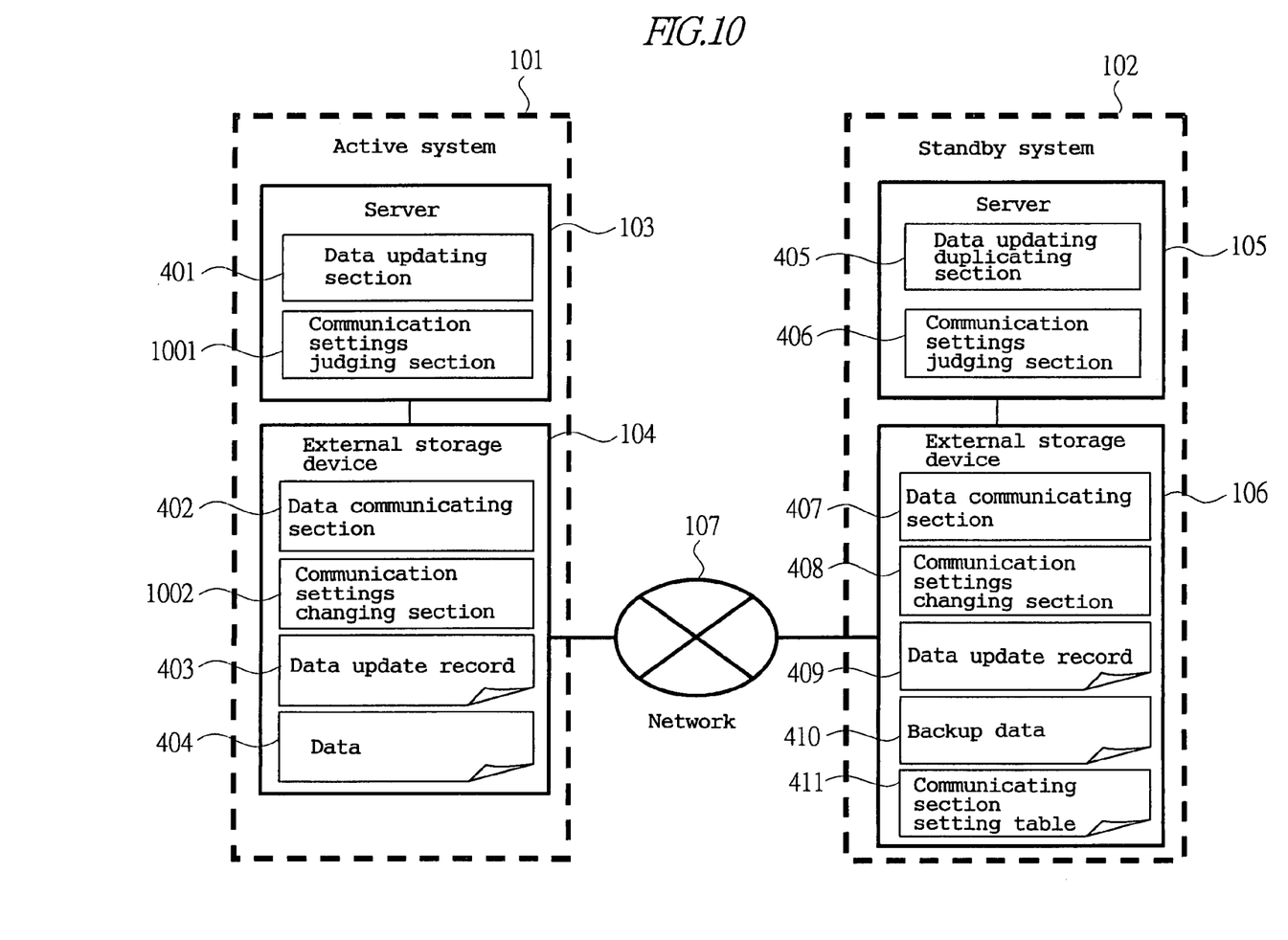
FIG. 10 is a functional diagram of a backup system according to a second embodiment.

FIG. 10 is a functional diagram of the data backup system according to the second embodiment of the present invention. The second embodiment differs from the first embodiment in that a communication settings judging section 1001 has been added to the server 103 of the active system and a communication settings changing section 1002 to the external storage device. Points of differences between the first embodiment and the second embodiment will now be explained.

Figure 11:
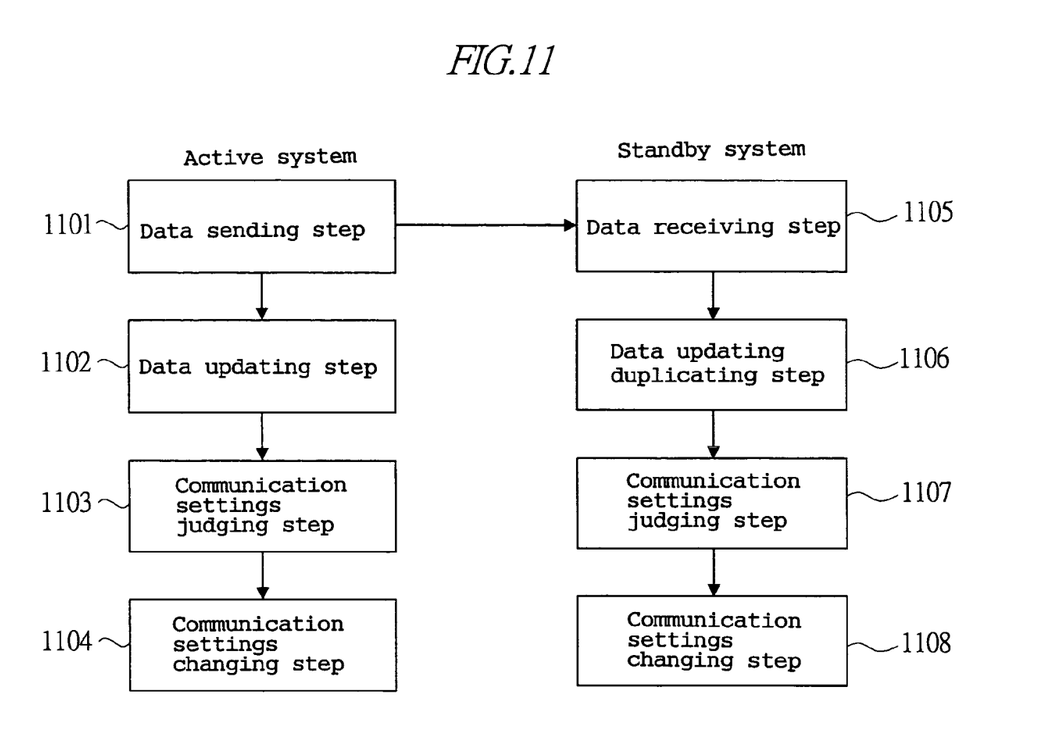
FIG. 11 is a flowchart illustrating an order of operations of respective sections according to the second embodiment.

FIG. 11 is a flowchart illustrating an order of operations of the respective sections according to the second embodiment. In the second embodiment, the flow of FIG. 11 is repeatedly executed for creating newest backups in the standby system. Operations of a data sending step 1101, a data receiving step 1105, and a communication settings changing step 1108 are identical to the data sending step 501, the data receiving step 503, and the communication settings changing step 506 of the first embodiment, respectively.

Figure 12:
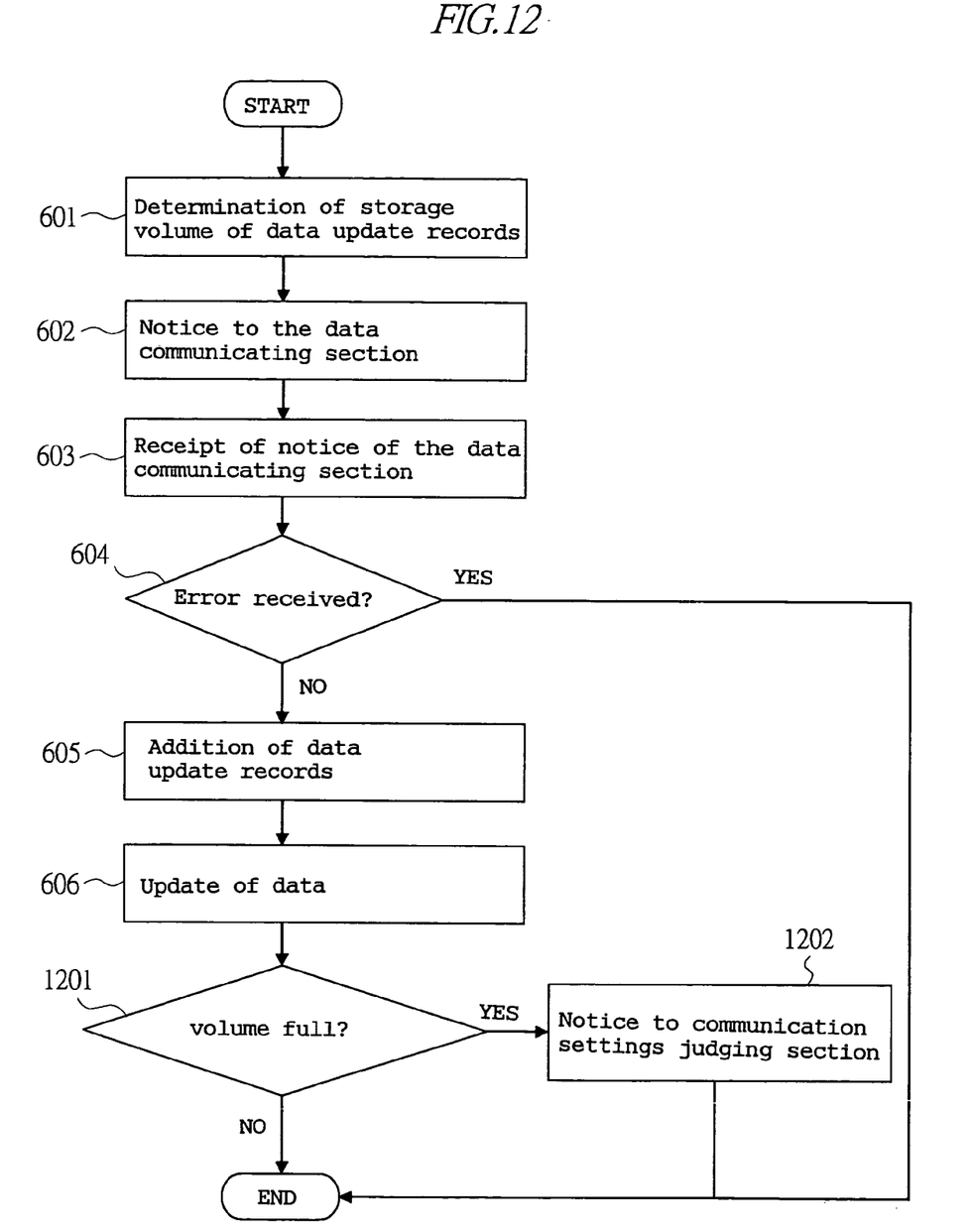
FIG. 12 is a flowchart illustrating operations of a data updating section according to the second embodiment.

FIG. 12 is a flowchart illustrating operations of the data updating section 401. Process 601, process 602, process 603, process 604, process 605 and process 606 of the flowchart of FIG. 12 are identical to those of the first embodiment. Judgment 1201 judges whether the volume has become full by adding data update records in process 605, and when it has become full, the flow proceeds to process 1202. The process 1202 notices the communication settings judging section 1001 of the name of the volume that has become full.

Figure 13:
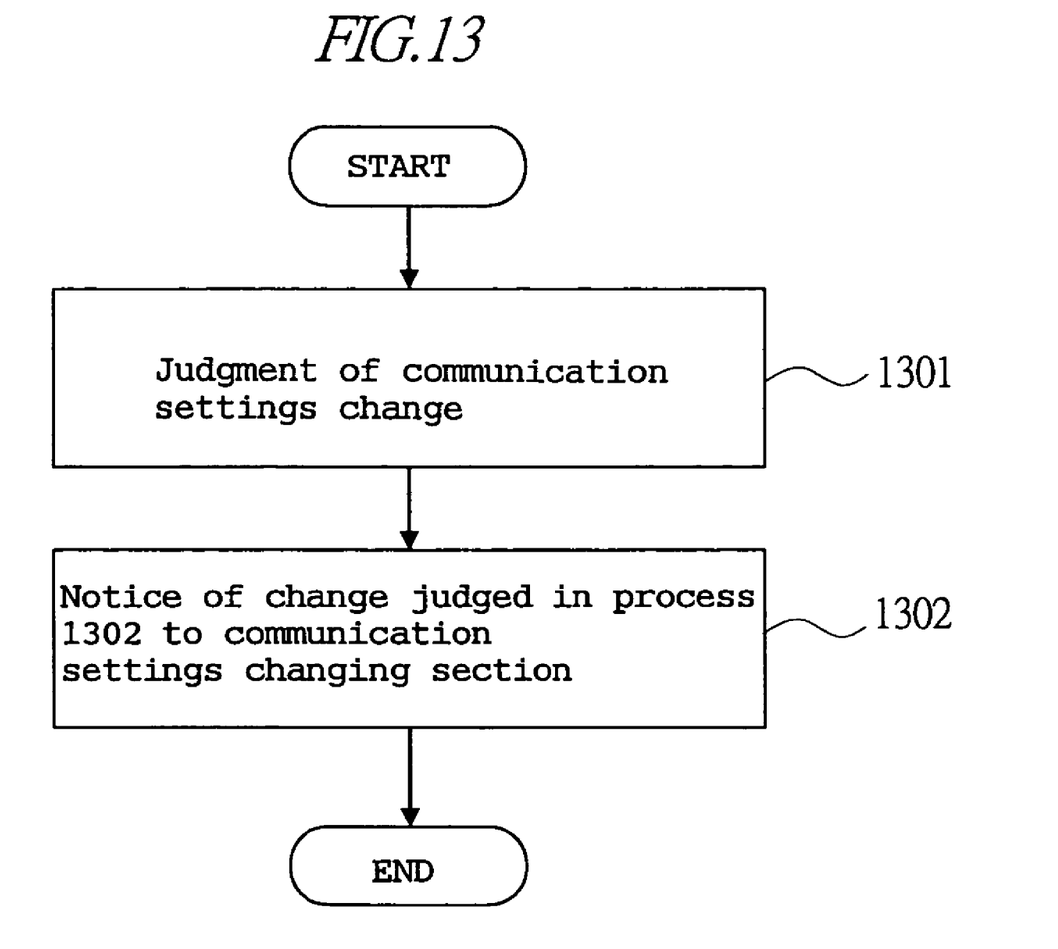
FIG. 13 is a flowchart illustrating operations of a data settings judging section according to the second embodiment.

FIG. 13 is a flowchart illustrating operations of the communication settings judging section 1001 of the active system. The communication settings judging section 1001 starts operation upon notice of the process 1202 of the data updating section 401. In process 1301, it is judged that the setting of the data communicating section for the volume that has become full is changed to "suspend". Process 1302 notices the change in the communication setting as judged in the process 1301 to the communication settings changing section 1002. The operation flow of the communication settings judging section 1001 corresponds to the communication setting judging step 1103.

The communication settings judging section 1002 starts operation upon notice of the process 1302 of the communication settings judging section 1001. The communication settings changing section 1002 changes the communication section setting tables 411 in accordance with changes in settings of the data communicating section as judged by the communication settings judging section 1001. Operations of the communication settings changing section 1002 correspond to the communication settings changing step 1104.

The communication settings judging section 406 of the second embodiment judges to change the communication setting to "sync" for the volume that has been referred by the data updating duplicating section 405 up to the end. This judgment is noticed to the communication settings changing section 408. Operations of the communication settings judging section 406 correspond to the communication settings judging step 1107.

The above is the second embodiment. The communication settings judging section 1001 of the active system sets the setting of the data communicating section for the volume, which has become full upon adding data update records by the data updating section 401, to "suspend". The communication settings judging section 406 of the standby system sets the setting of the communicating section for the volume of which reference by the data updating duplicating section 405 has been completed to "sync". Accordingly, data update records 409 of which reference by the data updating duplicating section 405 has not been completed yet will not be overwritten, and it is possible to prevent a case in which newest backup data cannot be created owing to overwriting of update records.

What is claimed is:

1. A data backup system that receives data update records and creates backup data, said data backup system comprising:
  a data communicating section for receiving data update records and storing them in an external storage device:
  a data updating duplicating section for referring to said data update records to create backup data:
  a communication settings judging section for judging changes in settings of said data communicating section: and
  a communication settings changing section for changing settings of said data communicating section,
  wherein said external storage device is divided into a plurality of storage areas,
  wherein orders of usage are defined for said storage areas for storing said data update records, and
  wherein said communication settings judging section judges settings of said data communicating section on the orders of usage of said storage areas that have been referred to by said data updating duplicating section.

2. The data backup system according to claim 1, wherein settings of said data communicating section can be made for each of said storage areas of said external storage device;
  wherein at least a first set value and a second set value are included as set values of connecting condition information; and
  wherein said communication settings judging section defines a storage area preceding the storage area that has been referred to by said data updating duplicating section as said second set value of connecting condition information.

3. A data backup system comprising an active system as a computer system of a backup source and a standby system as a computer system of a backup destination, and performing backup by sending data update records from said active system to said standby system,
  wherein said active system includes:
  a data updating section that stores data and data update records in an external storage device,
  a data communicating section that sends said data update records,
  a communication settings judging section that judges settings of said data communicating section, and
  a communication settings changing section that changes settings of said data communicating section; and
  wherein said standby system includes:
  a data communicating section that receives said data update records and stores them in an external storage device,
  a data updating duplicating section that refers to said data update records to create backup data,
  a communication settings judging section that judges changes in settings of said data communicating section, and
  a communication settings changing section that changes settings of said data communicating section.

4. The data backup system according to claim 3, wherein said external storage device of said active system and said external storage device of said standby system are divided into a plurality of storage areas;
  wherein orders of usage are defined for said storage areas for storing said data update records;
  wherein said communication settings judging section of said active system judges settings of said data communicating section on the orders of usage of said storage areas that have been referred to by said data updating section; and
  wherein said communication settings judging section of said standby system judges settings of said data communicating section on the orders of usage of said storage areas that have been referred to by said data updating duplicating section.

5. A data backup method for receiving data update records and creating backup data, said data backup method comprising:
  a data receiving step for receiving data update records and storing them in an external storage device;
  a data updating duplicating step for referring to said data update records to create backup data:
  a communication settings judging step for judging changes in settings for data communication in conjunction with said data updating duplicating step; and a communication settings changing step for changing settings for data communication in conjunction with said communication settings changing step wherein said external storage device is divided into a plurality of storage areas, wherein orders of usage are defined for said storage areas for storing said data update records, and wherein said communication settings judging step judges settings for data communication on the orders of usage of said storage areas that have been referred to in said data updating duplicating step.

6. The data backup method according to claim 5, wherein settings for data communication can be made for each of said storage areas of said external storage device; wherein at least a first set value and a second set value are included as set values of connection condition information; and wherein said communication settings judging step defines a storage area preceding the storage area that has been referred to in said data updating duplicating step as said second set value of connecting condition information.

7. A data backup method using an active system as a computer system of a backup source and a standby system as a computer system of a backup destination and performing backup by sending data update records from said active system to said standby system, wherein said active system includes:

a data updating step for storing data and data update records in an external storage device, a data sending step for sending said data update records in conjunction with said data updating step, a communication settings judging step for judging settings of a data communicating section and for data communication in conjunction with said data updating step, and a communication settings changing step for changing settings for data communication in conjunction with said communication settings judging step; and wherein said standby system includes:

a data receiving step for receiving said data update records and storing them in an external storage device, a data updating duplicating step for creating backup data in conjunction with said data receiving step, a communication settings judging step for judging changes in settings for data communication in conjunction with said data updating duplicating step, and a communication settings changing step for changing settings for data communication in conjunction with said communication settings judging step.

8. The data backup method according to claim 7, wherein said external storage device of said active system and said external storage device of said standby system are divided into a plurality of storage areas;

wherein orders of usage are defined for said storage areas for storing said data update records;

wherein said communication settings judging step of said active system judges settings for data communication on the orders of usage of said storage areas that have been referred to in said data updating step; and wherein said communication settings judging step of said standby system judges settings for data communication on the orders of usage of said storage areas that have been referred to in said data updating duplicating step.

9. The data backup method according to claim 8, wherein settings for data communication can be made for each of said storage areas of said external storage devices;

wherein at least a first set value and a second set value are included as set values of connecting condition information;

wherein said communication settings judging step of said active system judges to set storage area that has been updated in said data updating step as said second set value; and wherein said communication settings judging step of said standby system judges to set a storage area that has been referred to in said data updating duplicating step as said first set value of connecting condition information.

10. A data backup method for receiving data update records and for creating backup data and including:

a data receiving step for receiving data update records and storing them in an external storage device;

a data updating duplicating step for referring to said data update records to create backup data; a communication settings judging step for judging settings for data communication in conjunction with said data updating duplicating step; and a communication settings changing step for changing settings for data communication in conjunction with said communication settings changing step;

wherein said external storage device is divided into a plurality of storage areas; orders of usage are defined for said storage areas for storing said data update records; and wherein said communication settings judging step judges settings for data communication on the orders of usage of said storage areas that have been referred to in said data updating duplicating step, wherein settings for data communication can be performed for each of said storage areas of said external storage device; at least a first set value and a second set value of connecting condition information are included as set values of connecting condition information, and wherein said communication settings judging step defines a storage area preceding the storage area that has been referred to in said data updating duplicating step as said second set value of connecting condition information, and wherein said communication settings changing step terminates overwriting of data update records by changing setting for data communication in accordance with said second set value of connecting condition information as judged in said communication settings judging step.

11. A data backup method using an active system as a computer system of a backup source and a standby system as a computer system of a backup destination and performing backup by sending data update records from said active system to said standby system, wherein said active system includes: a data updating step for storing data and data update records in an external storage device;

a data sending step for sending said data update records in conjunction with said data updating step;

a communication settings judging step for judging settings of a data communicating section and for data communication in conjunction with said data updating step; and a communication settings changing step for changing settings for data communication in conjunction with said communication settings judging step;

wherein said standby system includes:
a data receiving step for receiving said data update records and storing them in an external storage device;
a data updating duplicating step for creating backup data in conjunction with said data receiving step;
a communication settings judging step for judging settings for data communication in conjunction with said data updating duplicating step; and
a communication settings changing step for changing settings for data communication in conjunction with said communication settings judging step,
wherein said external storage device of said active system and said external storage device of said standby system are divided into a plurality of storage areas;
wherein orders of usage are defined for said storage areas for storing said data update records,
wherein said communication settings judging step of said active system judges settings for data communication on the orders of usage of said storage areas that have been updated in said data updating step, and
wherein said communication settings judging step of said standby system judges settings for data communication on the order of usage of said storage areas that have been referred to in said data updating duplicating step;
wherein settings for data communication can be made for each of said storage areas; at least a first set value and a second set value of connecting condition information are included as set values of connecting condition information,
wherein said communication settings judging step of said active system judges to set a storage area that has been updated in said data updating step as said second set value of connecting condition information, and
wherein said communication settings judging step of said standby system judges to set a storage area that has been referred to in said data updating duplicating step as said first set value of connecting condition information; and
wherein said communication settings changing step of said active system changes settings for data communication in accordance with said second set value as judged in said communication settings judging step while said communication settings changing step of said standby system terminates overwriting of data update records by changing setting for data communication in accordance with said first set value of connection condition information as judged in said communication settings judging step.

* * * * *